(12) United States Patent
Haze et al.

(10) Patent No.: US 11,269,597 B2
(45) Date of Patent: Mar. 8, 2022

(54) REAL-TIME CODE RECOMMENDATIONS USING MACHINE LEARNING AND REINFORCEMENT LEARNING

(71) Applicant: SAP SE, Walldorf (DE)

(72) Inventors: Oren Haze, Kfar Saba (IL); Yihezkel Schoenbrun, Ra'anana (IL)

(73) Assignee: SAP SE, Walldorf (DE)

( * ) Notice: Subject to any disclaimer, the term of this patent is extended or adjusted under 35 U.S.C. 154(b) by 94 days.

(21) Appl. No.: 16/835,528

(22) Filed: Mar. 31, 2020

(65) Prior Publication Data
US 2021/0303447 A1 Sep. 30, 2021

(51) Int. Cl.
  *G06F 8/33* (2018.01)
  *G06F 11/36* (2006.01)
  *G06N 20/00* (2019.01)

(52) U.S. Cl.
  CPC ............ *G06F 8/33* (2013.01); *G06F 11/3664* (2013.01); *G06N 20/00* (2019.01)

(58) Field of Classification Search
  None
  See application file for complete search history.

(56) References Cited

U.S. PATENT DOCUMENTS

| | | | | |
|---|---|---|---|---|
| 10,048,945 B1* | 8/2018 | Makkar | ...... | G06F 8/36 |
| 10,055,205 B2* | 8/2018 | Di Balsamo | ...... | G06F 8/36 |
| 10,261,759 B2* | 4/2019 | Ng | ...... | G06F 11/3664 |
| 10,534,585 B1* | 1/2020 | Eberlein | ...... | G06N 5/04 |
| 10,620,923 B2* | 4/2020 | Allan | ...... | G06F 16/2358 |
| 10,754,645 B2* | 8/2020 | Chen | ...... | G06F 8/77 |
| 2008/0005235 A1 | 1/2008 | Hegde | | |
| 2011/0252394 A1* | 10/2011 | Sharma | ...... | G06F 11/3616 |
| | | | | 717/101 |
| 2012/0317544 A1* | 12/2012 | Komatsuzaki | ...... | G06F 8/36 |
| | | | | 717/106 |
| 2013/0268393 A1 | 10/2013 | Haze et al. | | |
| 2014/0325336 A1 | 10/2014 | Odenheimer et al. | | |
| 2015/0040101 A1 | 2/2015 | Rummler et al. | | |

(Continued)

OTHER PUBLICATIONS

Bruch et al., "Learning from Examples to Improve Code Completion Systems," ACM, 2009, 10pg. (Year: 2009).*

(Continued)

*Primary Examiner* — Ryan D. Coyer
(74) *Attorney, Agent, or Firm* — Fish & Richardson P.C.

(57) ABSTRACT

Methods, systems, and computer-readable storage media for receiving, from an integrated development environment (IDE), authored code, the authored code having been input by a developer to the IDE, receiving developer data representative of the developer, and context data and domain data associated with the authored code, determining, at least partially based on processing the authored code, the developer data, the context data, and the domain data through one or more machine learning (ML) models, that one or more code recommendations are to be displayed to the developer in the IDS, defining a sub-set of code recommendations at least partially based on the authored code and the context data, the sub-set of code recommendations comprising at least one code snippet, and displaying graphical representations of code recommendations in the sub-set of code recommendations to the developer within the IDE.

20 Claims, 5 Drawing Sheets

(56) References Cited

U.S. PATENT DOCUMENTS

| | | | |
|---|---|---|---|
| 2015/0135166 A1* | 5/2015 | Tarlow | G06F 8/75 |
| | | | 717/125 |
| 2017/0308375 A1* | 10/2017 | Lehner | G06F 11/302 |
| 2018/0232211 A1* | 8/2018 | Maurya | G06F 8/10 |
| 2018/0349114 A1* | 12/2018 | Brown | G06N 20/00 |
| 2019/0303107 A1* | 10/2019 | Kelly | G06N 20/20 |
| 2020/0380415 A1* | 12/2020 | Siracusa | G06F 8/33 |

OTHER PUBLICATIONS

Bulmer et al., "Predicting Developers' IDE Commands with Machine Learning," ACM, 2018, 4pg. (Year: 2018).*
Gasparic et al., "A context model for IDE-based recommendation systems," Elsevier, 2016, 20pg. (Year: 2016).*
Maalej et al., "Collecting and Processing Interaction Data for Recommendation Systems," Springer, 2014, 25pg. (Year: 2014).*
U.S. Appl. No. 16/430,565, filed Jun. 4, 2019, Haze et al.
U.S. Appl. No. 16/451,959, filed Jun. 25, 2019, Haze.

* cited by examiner

REAL-TIME CODE RECOMMENDATIONS USING MACHINE LEARNING AND REINFORCEMENT LEARNING

BACKGROUND

Software development entails one or more developers authoring code to produce source code. Source code is compiled to provide binary code that can be executed by a computer as an application. Developers interact with tools, such as an integrated development environment (IDE) and a version control system (VCS), to author code.

Code development is considered an extremely complex process and is commonly performed by teams of developers. However, there is often a significant performance gap between developers. For example, terms have been developed in developer communities to describe varying levels of developers (e.g., in terms of proficiency, efficiency, quality). For example, the term "10xer" is used to describe developers who put out an order of magnitude more useful code than their peers. Even within developers of the same or similar level of experience, developers have difficulty in maintaining code authored by other developers, because each developer has a unique style. It can also be noted that, when it comes to new source code (e.g., authoring an application from scratch), the learning curve for even the best developers is high.

All of this materializes as disparity in quality of source code that is developed. This can result in inconsistency across different source code and inconsistency within source code. For example, a more experienced developer can provide source code (or portions of source code) that is better quality (e.g., more efficient in terms of technical resources to execute) than source code (or portions of source code) provided by a less-experienced developer. While tools have been developed to help improve developer skills to reduce or mitigate variance in skill-level across developers, such tools traditionally rely on long-term experience and time-consuming manual code reviews. Further, traditional tools do not significantly accelerate developer ramp-up with new source code.

SUMMARY

Implementations of the present disclosure are directed to providing code recommendations to developers for coding source code. More particularly, implementations of the present disclosure are directed to a code recommendation system for intelligent, personalized, and contextualized real-time code recommendations using machine learning (ML) and reinforcement learning (RL).

In some implementations, actions include receiving, from an IDE, first authored code, the first authored code having been input by a developer to the IDE, receiving developer data representative of the developer, and context data and domain data associated with the first authored code, determining, at least partially based on processing the first authored code, the developer data, the context data, and the domain data through one or more machine learning (ML) models, that one or more code recommendations are to be displayed to the developer in the IDS, defining a sub-set of code recommendations at least partially based on the first authored code and the context data, the sub-set of code recommendations comprising at least one code snippet, and displaying graphical representations of code recommendations in the sub-set of code recommendations to the developer within the IDE. Other implementations of this aspect include corresponding systems, apparatus, and computer programs, configured to perform the actions of the methods, encoded on computer storage devices.

These and other implementations can each optionally include one or more of the following features: the developer data is received based on a user identifier that uniquely identifies the developer, at least a portion of the developer data representing an experience level of the developer, the sub-set of code recommendations being defined at least partially based on the experience level of the developer; the sub-set of code recommendations is defined in response to determining that the experience level of the developer is below a particular experience level; the developer data is received based on a user identifier that uniquely identifies the developer, at least a portion of the developer data representing a bug fix in code previously authored by the developer, the sub-set of code recommendations being defined at least partially based on the bug fix; the domain data represents a domain, within which an application resulting from the first authored code is to be executed, the sub-set of code recommendations being defined at least partially based on the domain; actions further include receiving, from the IDE, second authored code, the second authored code having been input by the developer to the IDE, and determining, at least partially based on processing the second authored code, the developer data, the context data, and the domain data through the one or more machine learning (ML) models, that one or more code recommendations are not to be displayed to the developer in the IDS; and actions further include receiving input data indicative of whether a code recommendations in the sub-set of code recommendations has been one of accepted and declined by the developer, wherein at least one ML model of the one or more ML models is adjusted based on the input data.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to providing code recommendations to developers for coding source code. More particularly, implementations of the present disclosure are directed to a code recommendation system for intelligent, personalized, and contextualized real-time code recommendations using machine learning (ML) and reinforcement learning (RL). Implementations can include actions of receiving, from an integrated development environment (IDE), authored code, the authored code having been input by a developer to the IDE, receiving developer data representative of the developer, and context data and domain data associated with the authored code, determining, at least partially based on processing the authored code, the developer data, the context data, and the domain data through one or more machine learning (ML) models, that one or more code recommendations are to be displayed to the developer in the IDS, defining a sub-set of code recommendations at least partially based on the authored code and the context data, the sub-set of code recommendations comprising at least one code snippet, and displaying graphical representations of code recommendations in the sub-set of code recommendations to the developer within the IDE.

To provide further context for implementations of the present disclosure, and as introduced above, the development of source code is an extremely complex process and is commonly performed by teams of developers. However, there is often a significant performance gap between developers. This can be based on disparities in overall experience (e.g., one developer has been coding for years longer than another developer), and/or disparities in particular experience (e.g., one developer being better at security-related coding than another developer). For example, terms have been developed in developer communities to describe varying levels of developers (e.g., in terms of proficiency, efficiency, quality). For example, the term "10xer" is used to describe developers who put out an order of magnitude more useful code than their peers. Even within developers of the same or similar level of experience, developers have difficulty in maintaining code authored by other developers, because each developer has a unique style. It can also be noted that, when it comes to new source code (e.g., authoring an application from scratch), the learning curve for even the best developers is high.

All of this materializes as disparity in quality of source code that is developed. This can result in inconsistency across different source code and inconsistency within source code. For example, a more experienced developer can provide source code (or portions of source code) that is better quality (e.g., more efficient in terms of technical resources to execute) than source code (or portions of source code) provided by a less-experienced developer. While tools have been developed to help improve developer skills to reduce or mitigate variance in skill-level across developers, such tools traditionally rely on long-term experience and time-consuming manual code reviews. Further, traditional tools do not significantly accelerate a developer ramp-up with new source code.

For example, existing source code review systems have a challenge in that they identify many portions of code within a single body of source code that can be improved. Such traditional code review systems then choose a subset of the portions of code to show the developer. In this manner, developers are not overwhelmed with portions of code that need attention. In order for such a code review system to select portions to be displayed, traditional code review systems can use static rules that select portions based on issue type and severity. Further, traditional code review systems have a challenge in that there are often multiple ways of resolving identified issues.

Again, so as to not overwhelm the developer, a code review system must pick which recommendations to suggest. In some instances, recommendations are selected based on which are determined to be best (e.g., in terms of best practices), without consideration for the uniqueness of the developer, organizational needs, or the context of the application that is being developed. In addition, traditional code review systems can review source code after it has been written, which can require developers to go back into the source code to implement changes. This is not only inefficient in terms of time, it is inefficient in terms of the underlying technical resources (e.g., processing, memory) expended in the review process.

In view of the above context, and as described in further detail herein, implementations of the present disclosure are directed to a code recommendation system that provides intelligent, personalized, and contextualized real-time code recommendations using ML and reinforcement learning RL. The code recommendation system of the present disclosure provides code recommendations in real-time, as a developer is authoring code (e.g., within an IDE). As used herein, the term real-time describes one or more operations that are executed without any intentional delay, taking into account the processing, and/or communication limitations of the computing system(s) performing the operation(s) and the time needed to initiate, and/or perform the operation(s). Real-time may be used to describe operations that are automatically executed in response to a triggering event (e.g., receiving code typed into the IDE). The developer can accept a recommendation (e.g., the recommendation completing a portion of code that the developer is authoring), or ignore a recommendation (e.g., the developer keeps typing, ignoring the recommendation).

Figure 1:
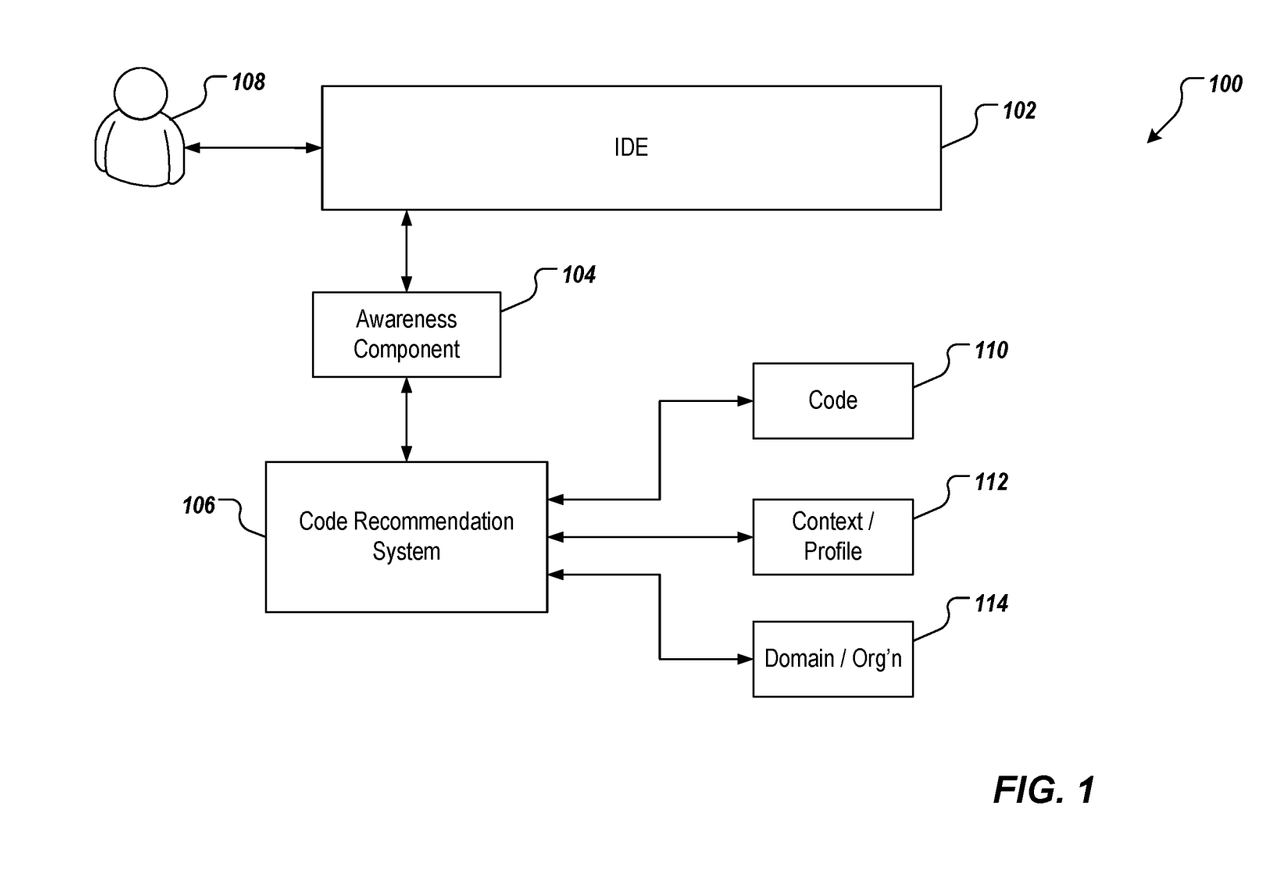
FIG. 1 depicts an example high-level architecture in accordance with implementations of the present disclosure.

FIG. 1 depicts an example architecture 100 in accordance with implementations of the present disclosure. The example architecture 100 includes an IDE 102, an awareness component 104, and a code recommendation system 106. As discussed in further detail herein, the awareness component 104 monitors and analyzes activities related to source code access/changes by developers within the IDE 102. For example, a developer 108 can use the IDE 102 to access source code (e.g., through a version control system (VCS) (not shown)). In some examples, the awareness component 104 can monitor activities of the developer 108 and determine context information and inform the code recommendation platform 106 of the activities and/or context information. Example context information can include the particular developer authoring the source code, a customer, for which the source code is being authored, and a domain of the source code and/or of a particular code snippet being authored. As described in further detail herein, as the developer 108 authors code in the IDE 102, the code recommendation system 106 monitors coding activity of the developer in real-time and provides code recommendations to the developer in real-time.

In some examples, each of the components of the example architecture 100 is provided as one or more computer-executable programs that are executed by one or more computing devices. In some examples, the example architecture 100 can be realized in a client-server environment, in which components are implemented on a client-side and components are implemented on a server-side. In some examples, the client-side and the server-side communicate through a network. In some examples, the awareness component 104 and/or the code recommendation system 106 can be provided as one or more plug-ins to the IDE 102.

In some examples, the IDE 102 provides comprehensive facilities to developers for software development. Example IDEs can include a source code editor, build automation tools, a debugger, a compiler and/or an interpreter. An example IDE includes Eclipse provided by the Eclipse Foundation. In accordance some implementations, the IDE 102 can include side-panels, plug-ins, and/or entries in context menus that enrich the IDE 102 with awareness functionality and code recommendations, discussed in further detail herein. In some examples, a VCS can track changes in a software project during a development process. In some examples, the VCS can include revision control to track and manage changes to software components in a distributed development process. Example VCSs can include Apache Subversion provided by the Apache Software Foundation, and Perforce provided by Perforce Software, Inc.

In accordance with implementations of the present disclosure, the code recommendation system 106 accesses a plurality of data sources to provide real-time code recommendations (e.g., code recommendations for code as the developer 108 types the code), as described herein. In the depicted example, the data sources include a code source 110, a context and profile source 112, and a domain and organization source 114. In some examples, the code source 110 includes code (e.g., snippets of code) from multiple sources that can include, without limitation, code sources, open source (OS) code, enterprise code repositories, code history, internal code repositories, ticketing and bug fix system. In general, the code source 110 provides code that can be recommended in real-time through the code recommendation system 106. In some examples, the context and profile source 112 includes data from one or more context sources and one or more profile sources, which can include, without limitation, location, date/time, developer profile, developer preferences, experience, expertise (e.g., security, performance), role/level of the developer, terminology, and trainings. In some examples, the domain and organization source 114 includes data representative of lines of business (LoBs), guidelines, technologies, standards, and timelines.

In some examples, during a development session (e.g., a time, during which the developer 108 authors code in the IDE 102), activity information is provided to the awareness component 104 from the IDE 102. Example activity information can include a user identifier (user id) that uniquely identifies the developer 108, a code identifier (code id) that uniquely identifies a code artifact being accessed (e.g., class name), cursor position(s), and keystrokes (e.g., indicating characters that the developer 108 is typing into the IDE 102). The awareness component 104 can provide the activity information to the code recommendation system 106, which can process the activity information to selectively provide code recommendations.

For example, at the outset of a development session (e.g., when the developer 108 logs into the IDE 102), the user_id of the developer 108 can be provided to the code recommendation system 106 (e.g., by the awareness component). In this manner, the code recommendation system 106 can access profile information for the developer, which can be used to determine code recommendations that are to be recommended to the developer 108 (e.g., based on experience, style, and/or particular expertise of the developer 108).

In some examples, the developer 108 can access a source code project to open within the IDE 102 to author code within the source code project. In some examples, the source code project includes one or more artifacts, each artifact including code (e.g., a class, a method). In some examples, the source code project and/or each artifact is associated with metadata that provides context. For example, the metadata can include domain data representative of a domain of the code (e.g., security) and/or a domain of the source code project (e.g., banking, engineering, educational). As described herein, the code recommendation system 106 can access domain profile information for the domain(s), which can be used to determine code recommendations that are to be recommended to the developer 108 (e.g., the domain profile information for a banking domain can indicate that security is of a higher priority than execution speed).

In some examples, the metadata can indicate one or more customers, for which the source code is being developed. For example, the metadata can include a set of customer identifiers (customer_ids), each customer_id uniquely identifying a customer. As described herein, the code recommendation system 106 can access profile information for the customer, which can be used to determine code recommendations that are to be recommended to the developer 108.

In accordance with implementations of the present disclosure, and as described herein, the code recommendation system (e.g., the code recommendation system 106 of FIG. 1) provides various types of code recommendations to developer. Example types of code recommendations can include, without limitation, a code recommendation on how to modify code currently being authored within the IDE, a code recommendation on wow to code the next line(s) of code (e.g., providing example code snippet(s), suggesting appropriate third-party libraries), and a code recommendation on actions to take on code (e.g., refactoring).

The code recommendation system of the present disclosure operates in real-time as code is being authored and uses ML to analyze the code being authored. The code recommendation system provides code recommendations based on code context, organizational context, and developer context. In some examples, the code context can represent context of the particular portion of code within the overall source code. The code context is then used to determine code that typically follows within the same type of project, how security, performance or other considerations have been prioritized in the past (e.g., both by looking at existing code, and which of the recommendations suggested by this code assistant had been chosen by developers in the past), as well as considering maintenance, patch, and/or support requirements for the source code.

In some examples, organizational context includes data representative of an environment and/or organization, for which the source code is being written. Example organization can include a bank and an engineering firm, each of which can be reflected in the organizational context. In some examples, for organizations such as a bank, security of the source code may be a higher priority. Consequently, code recommendations associated with security issues (e.g., vulnerabilities) and or suggestions for security-enhancing code can be presented to the developer and prioritized higher. In some examples, for organizations such as an engineering firm, accuracy of the source code may be a higher priority. Consequently, code recommendations associated with accuracy issues (e.g., bugs) and or suggestions for accuracy-enhancing code can be presented to the developer and prioritized higher.

In some implementations, organizational context can also be provided based on data stored in an organization profile (e.g., customer profile). In some examples, the organization can indicate any constraints they may have for a particular source code project (e.g., effectively a slider between "better code quality" and "faster delivery"). In some examples, legal constraints may be indicated (e.g., whether requirements of the General Data Protection Regulation (GDPR) must be respected for this particular source code). In some examples, when making code recommendations, organizational and/or legal constraints may influence what kind of security to use, as well as any third-party library licenses that may be recommended.

By incorporating both the context of the source code (i.e., the context that the resulting application executes in), the organizational context, and/or legal context, the code recommendations provided in accordance with implementations of the present disclosure are customized for both explicit.

As introduced above, another input for providing code recommendations is the unique profile of the developer. This takes the form of explicitly selected preferences (e.g., settings provided within the developer profile) and implicit preferences (e.g., open source versus proprietary, refactoring versus focused changes, elegant versus clearer code, performance versus memory focus, security focus). In some examples, previous code that the developer has authored can be considered (e.g., what kinds of mistakes the developer tends to make, and by extension, their strengths and weaknesses, such as often forgetting to close connections in a finally clause, or not writing enough/proper integration tests). In some examples, a role of the developer can be considered (e.g., junior, senior, architect). In some examples, an expertise (e.g. security expert) of the developer can be considered.

In some examples, the profile of a developer can be enhanced based on additional information. In some examples, additional information can be provided from internal and/or external information sources. Example internal information sources can include forums and/or discussion groups that are internal to an enterprise. In some examples, external information sources can include information sources that are not directly affiliated with an enterprise (e.g., company, institution) that is performing/supporting the development. Example external information sources can include computer-implemented social networking services, such as online forums and/or discussion groups, Twitter, Facebook, Google+, LinkedIn, and the like. In general, by providing a link to additional information sources, developer-specific information can be enhanced. For example, a social networking profile associated with a developer can be provided by a social networking service (e.g., Twitter, Facebook, Google+, LinkedIn). In this manner, the code recommendation system can be provided with a better understanding of the background and/or experience of the particular developer.

Further, and as described herein, the code recommendations of the code recommendation system that the developer has accepted/declined can be considered in subsequent code recommendations (e.g., if the developer always declines a particular code snippet, the code snippet is not recommended in the future). Accordingly, by considering the code recommendations accepted/declined by the particular developer, the code recommendation system of the present disclosure enables the ML models (described in further detail herein) to learn and adapt over time. This adaptation can be along multiple aspects including, for example: which code to recommend changing, how often and when to make a code recommendation, how many options to include as code recommendations, and/or in which order to display the code recommendations. By adapting the ML model(s) through RL using these inputs, the ML model(s) consistently improve on code recommendations, and that improve the developer's weaknesses.

As described herein, the code recommendation system of the present disclosure provides real-time, personalized, intelligent code recommendations for developers that are developing source code. The code recommendation system can make code recommendations based on algorithms that are configured to recommend the right code, for the right developer, in the right context (e.g., "who", "when", "what", and "why" recommendations). That is, even though code can vary between developers, the code recommendation system can perform, within a given context (e.g., code context, organization context, particular developer), automatic code recommendations in real-time.

A first example provides a non-limiting illustration of implementations of the present disclosure. In the first example, a developer can author code for establishing a TLS connection between servers that, when executed in an application, enables secure communication between the servers. In the first example, the code recommendation system receives the lines of code (code snippet) representing instructions for the TLS connection from the IDE. The code recommendation system can process the code snippet to predict one or more following lines of code. For example, the code recommendation system can input the code snippet into a ML model, and the ML model can provide an output (e.g., prediction) indicating a code snippet that should follow the code snippet authored by the developer. For example, the code recommendation system can determine that a code snippet including instructions for executing a TLS handshake should follow the code snippet input by the author.

Continuing with the first example, the code recommendation system can determine that the developer is relatively novice (e.g., from the profile of the developer) and/or that the domain indicates that security is a priority (e.g., banking domain). In response, the code recommendation system can make a code recommendation to the developer, the code recommendation including a code snippet for the TLS handshake, the code snippet being particularly robust in terms of security. In this manner, the code recommendation system enhances the overall quality of the resulting source code, and also provides a code recommendation that the developer can learn/grow from, enhancing the developer's skill set. As an alternative example, the code recommendation system can determine that the developer is very experienced with particular expertise in Internet-security (e.g., from the profile of the developer). In response, the code recommendation system can refrain from making a code recommendation to the developer. In this manner, the code recommendation system throttles code recommendations, so as not to overwhelm the developer with code recommendations that they likely would not learn/grow from.

A second example provides another non-limiting illustration of implementations of the present disclosure. In the second example, a developer can author code for establishing a connection with a database that, when executed in an application, enables the application to query the database. In the second example, the code recommendation system receives the lines of code (code snippet) representing instructions for the connection with the database from the IDE. The code recommendation system can process the code snippet to predict one or more following lines of code. For example, the code recommendation system can input the code snippet into a ML model, and the ML model can provide an output (e.g., prediction) indicating a code snippet that should follow the code snippet authored by the developer. For example, the code recommendation system can determine that a code snippet including instructions for adding a security token should follow the code snippet input by the author.

Continuing with the second example, the code recommendation system can determine that the developer had previously authored code for establishing a connection with the database, but that a bug fix had been flagged for the previously authored code, which bug fix slowed down the development process and expended technical resources to fix and retest. In response, the code recommendation system can make a code recommendation to the developer, the code recommendation including a code snippet for addition of the security token. In this manner, the code recommendation system provides a focused code recommendation based on the past experience of the developer.

Figure 2:
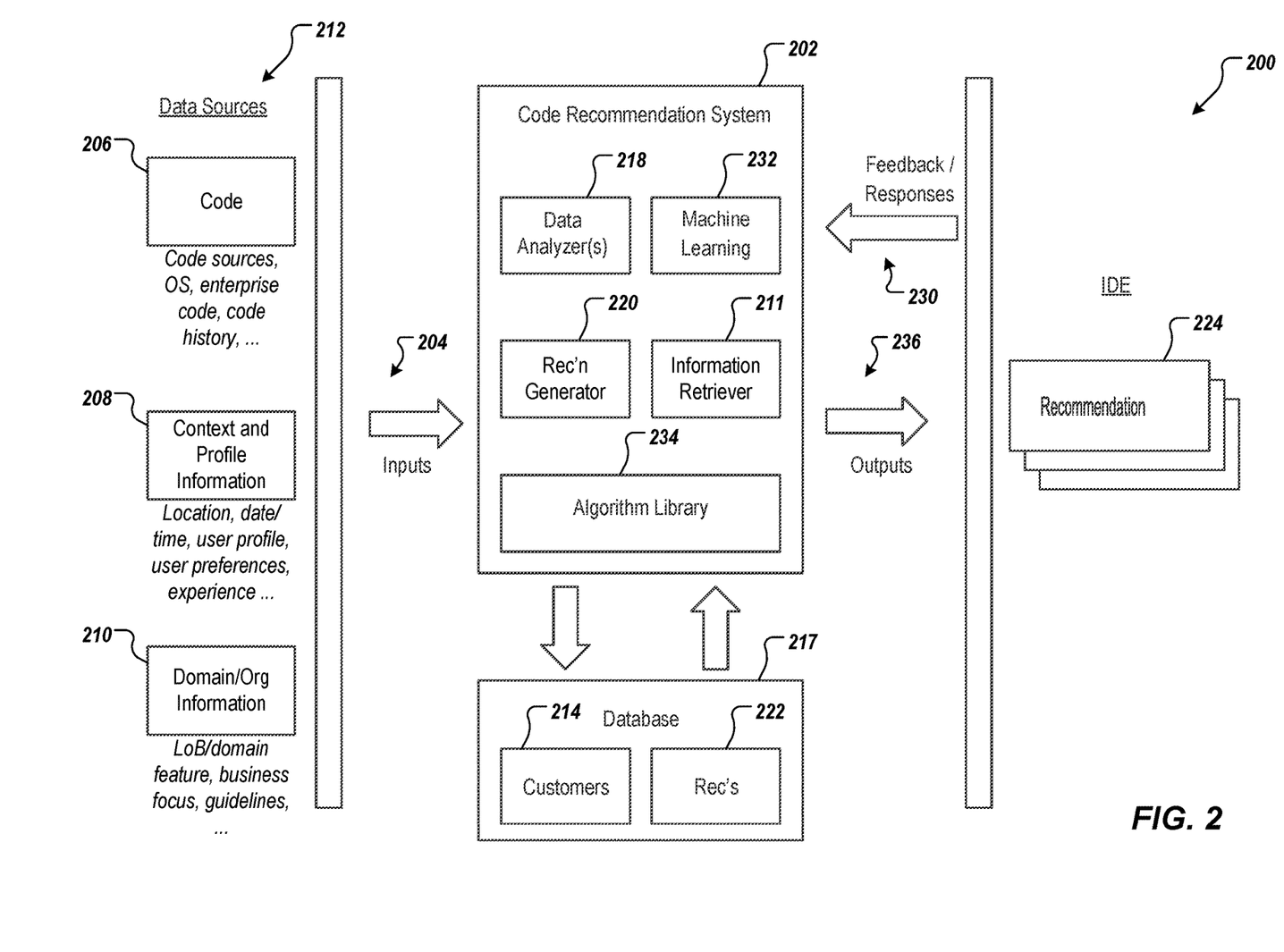
FIG. 2 depicts an example conceptual architecture in accordance with implementations of the present disclosure.

FIG. 2 depicts an example conceptual architecture 200 in accordance with implementations of the present disclosure. A code recommendation system 202 can obtain a variety of inputs 204. The inputs 204 can include code data 206 (e.g., code snippets) that can be recommended to a developer, context and profile information 208, and domain/organization information 210 (e.g., for a particular domain that the source code is being written for, for a particular organization that the source code is being written for).

Some or all of the inputs 204 can be obtained by an information retriever 211. The information retriever 211 can request the code data 206, the developer, context and profile information 208, and the domain/organization information 210 from one or more data sources (e.g., the data source depicted and/or described herein with reference to FIG. 1). In some examples, the information retriever 211 can automatically receive the code data 206, the developer, context and profile information 208, and the domain/organization information 210 from the data sources. For example, the code recommendation system 202 can request information from the data sources (e.g., in response to a developer logging into the IDE, in response to a code artifact being opened within the IDE). In some implementations, the code recommendation system 202 can obtain customer information 214 (e.g., information representative of a customer, for which the source code is being developed) that is stored internally in a database 217 by the code recommendation system 202 or another system at a same organization as the code recommendation system 202.

In some examples, the code data 206 can include, without limitation, code sources, OS code, enterprise code repositories, code history, internal code repositories, ticketing and bug fix system. In general, the code data 206 includes code (e.g., code snippets) that can be recommended in real-time through the code recommendation system 202.

In some examples, the developer, context and profile information 208 includes data from one or more context sources and one or more profile sources, which can include, without limitation, location, date/time, developer profile, developer preferences, experience, expertise (e.g., security, performance), role/level of the developer, terminology, and trainings. For example, the information retriever 211 can submit a request for the context and profile information 208, the request including the user_id of the developer (the user_id being obtained when the developer logs into the IDE). In some examples, one or more data sources, from which the context and profile information 208 is provided can provide respective responses to the request, the responses including data that is specific to the developer. By way of non-limiting example, a data source can maintain a user profile for the developer (e.g., a human resource management (HRM) system of an enterprise that employs the developer can maintain a user profile for the developer). In some examples, the user profile indicates one or more of developer preferences, experience, expertise (e.g., security, performance), role/level of the developer, terminology, and trainings, among other information.

In some examples, the domain/organization information 210 includes data representative of LoBs, guidelines, technologies, standards, and timelines. In general, the domain/organization information 210 can include an overview of customer characteristics, such as a LoBs, types of transactions, or types of data used by the customer. Here, the customer is an entity, for which the source code is being developed (e.g., a customer of the enterprise that employs the developer). In some examples, the domain/organization information 210 received by the code recommendation system 202 can be information for which the code recommendation system 202 has been permitted to obtain, by a respective customer. For example, the information retriever 211 can submit a request for the domain/organization information 210, the request including a customer_id of the customer (e.g., the customer_id being obtained when source code being developed for the customer is accessed within the IDE). In some examples, one or more data sources, from which the domain/organization information 210 is provided can provide respective responses to the request, the responses including data that is specific to the customer. By way of non-limiting example, a data source can maintain a customer profile for the customer (e.g., a customer relationship management (CRM) system of an enterprise that develops source code for the customer can maintain a customer profile for the customer).

In some examples, context information, whether for the code, the developer, the enterprise, or the customer, can include context associated with obtained information (e.g., the code data 206, the developer, context and profile information 208, and the domain/organization information 210), such as a date, time, or location of data capture (e.g., date/time when a code snippet of the code data 206 was created and/or last modified). In some examples, date/time information can be provided as a timestamp that specifies a particular instance of date/time. In some examples, date/time information can represent particular date or time periods, such as afternoon-time, morning-time, weekday, weekend, a particular season, end-of-quarter, or end-of-year. For example, location information can correspond to a customer's location such as a city, a state, or a country. Other context information can include historical usage, or known fluctuations or events (e.g., holidays or events that may affect resource utilization for an ecommerce customer, for example).

In some implementations, the domain/organization information 210 can be stored by the code recommendation system 202 in the customer data 214. In some implementations, context information that may have been associated with the domain/organization information 210 can be stored in the database 217 and linked to respective associated data.

In some implementations, one or more data analyzers 218 (e.g., data mining component(s)) can analyze the developer, context and profile information 208, and the domain/organization information 210 to determine code recommendations. For example, the data analyzers 218 can identify code in the code source(s) that is the same as or sufficiently similar to code that has been used in similar circumstances (e.g., same developer, same customer, same domain, similar developer). In some implementations, a recommendation generator 220 can analyze the generated predictions for purposes of generating one or more code recommendations for the developer.

In some implementations, the recommendation generator 220 uses a machine learning (ML) component 232 for generating code recommendations. In some implementations, one or more ML models are used. ML models or algorithms can include Collaborative Filtering (CF), Association Rules (AR), Artificial Neural Networks (ANN), Term Frequency-Inverse Document Frequency (TF-IDF), or Optimized Recommendations based Basket Size (ORBS). In general, each ML model is iteratively trained, where, at each iteration, a loss value is determined based on a loss function. The loss value represents a degree of accuracy of the output of the ML model. The loss value can be described as a representation of a degree of difference between the output of the ML model and an expected output of the ML model (the expected output being provided from training data). In some examples, if the loss value does not meet an expected value (e.g., is not equal to zero), parameters of the ML model are adjusted, and another iteration of training is performed. In some instances, this process is repeated until the loss value meets the expected value. In accordance with implementations of the present disclosure, a ML model can be trained based on a training data including code recommendations (expected values) and developer data, the context data, and the domain data (input values).

For example, multiple training sets can be provided and each training set can include [code recommendation, {developer data, context data, domain data}]. During training, the {developer data, context data, domain data} can be provided as input to the ML model, which processes the data to provide an output code recommendation. The loss function is used to compare the output code recommendation to the code recommendation provided in the training set, and parameters of the ML model can be selectively adjusted based on the loss value provided from the loss function. In some examples, training is executed for all training sets.

Algorithm code or parameters can be stored in an algorithm library 234. When multiple algorithms (ML or other types) are used, the code recommendation generator 220 can combine several recommendation approaches together and aggregate results. Algorithm outputs can be aggregated to determine final recommendations, for example. The algorithm library 234 can include other types of algorithms. For example, pattern-matching algorithms or other mathematical algorithms can be accessed by the components of the code recommendation system 202 components from the algorithm library 234.

Figure 3:
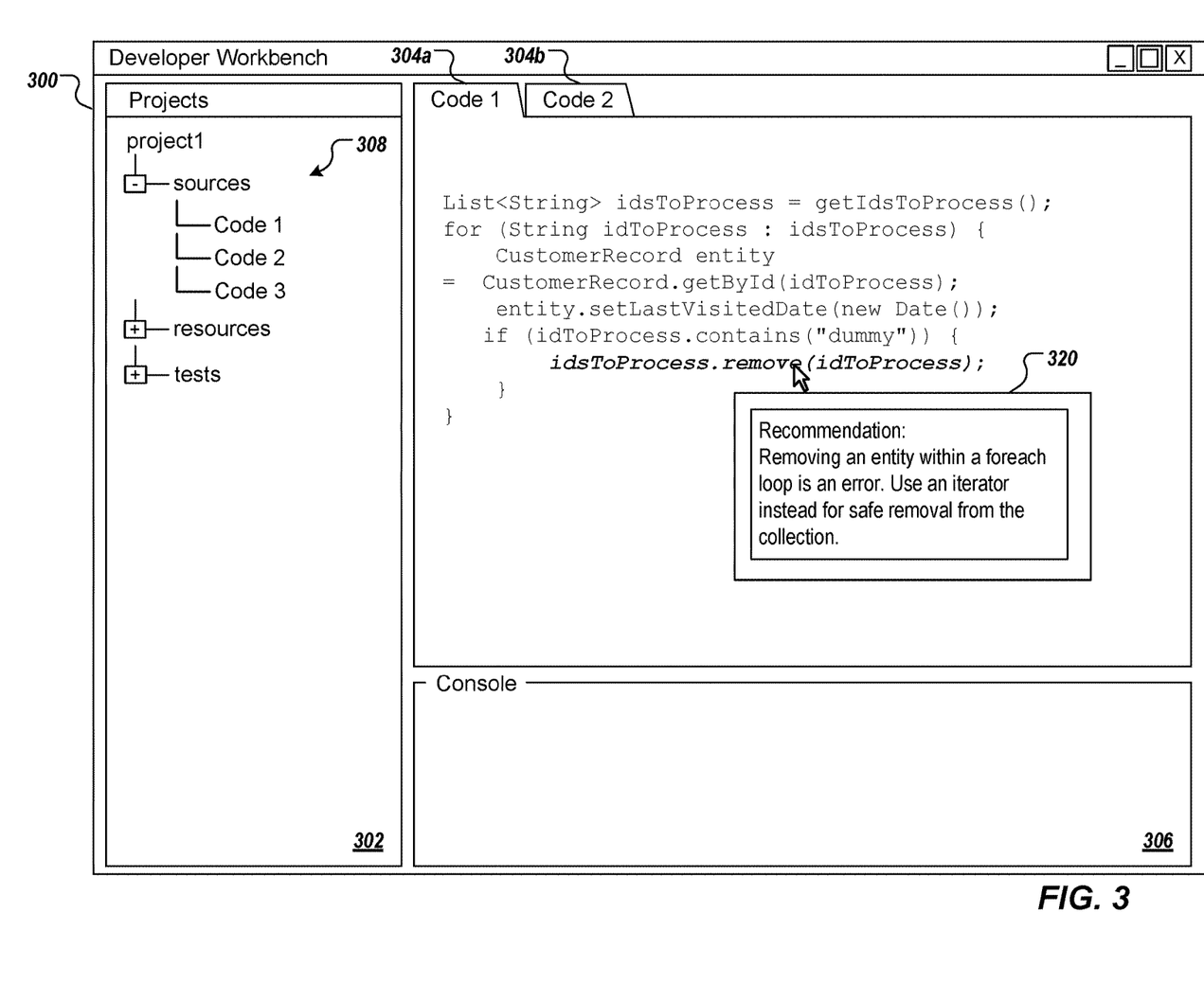
FIG. 3 depicts an example screen-shot in accordance with implementations of the present disclosure.

In some implementations, generated code recommendations 222 can be presented to developers (e.g., as presented recommendations 224 that are displayed within the IDE). In some examples, presented recommendations 224 can each include a link or other mechanism that enables the developer to accept or decline the code recommendation. In some examples, and as described in further detail herein with reference to FIG. 3, presented recommendations 224 can be presented adjacent to code that the developer is authoring within the IDE.

In some implementations, the data analyzers 218, the information retriever 211, and the recommendation generator 220 can perform processing at various times and in response to various triggers. In general, processing by the code recommendation system 202 can be ongoing during authoring of source code by one or more developers. In this manner, a code recommendation can be provided in real-time, as code is authored. For example, as a developer inputs code (e.g., executes keystrokes to input characters), the code, or portions of code can be matched to code data to determine a set of code data that may be relevant, and the code recommendations can be identified from the set of code data based on context information, developer profile, customer context, domain, customer profile, and the like, as described herein.

In some implementations, after recommendations 222 are presented (e.g., as presented recommendations 224), feedback/responses 230 can be provided to the code recommendation system 202. In some examples, feedback/responses 230 can include, without limitation, indications of whether the code recommendations were acted upon (e.g., accepted by the developer), or were dismissed without being acted upon. For a code recommendation that was presented, the feedback 230 can include usage information for the accepted/declined code recommendation (e.g., developer profile, context, customer profile, domain). In some implementations, the feedback 230 can be used for RL of the ML engine 232 to tailor future code recommendations. For example, weights or parameters of one or more ML models can be adjusted. In some examples, if the code recommendation is accepted, the one or more ML models can be adjusted to bias the ML model(s) towards a similar match in the future. In some examples, if the code recommendation is declined, the one or more ML models can be adjusted to bias the ML model(s) away from a similar match in the future.

In some implementations, certain code recommendations can be acted upon at a higher-frequency than other code recommendations. For example, for a given code recommendation (e.g., a particular code snippet that is recommended to multiple developers), if less than a certain predefined percentage of developers accept the code recommendation for a particular context/domain, the code recommendation can be reduced or eliminated for future code recommendations. As a specific example, if a less than two percent of developers accept a particular code recommendation, the ML engine 232 can send information to the recommendation generator 220, so that the code recommendation is not recommended (or recommended less frequently or only recommended based on particular criteria) in the future. As another example, if a particular code recommendation is accepted at a rate of 90%, the ML engine 232 can send information to the recommendation generator 220, so that the code recommendation is presented to developers more often under the same or similar conditions (e.g., domain, context).

Other types of outputs 236 can be produced by the code recommendation system 202. For example, the code recommendation system 202 can expose customer information 214 and code recommendation 222 to privileged users, for analysis and understanding of customer resource landscapes and code recommendation history. In some implementations, stored code recommendations 222 can include information on recommendation acceptance rates. Exposed information from the database 217 can be provided in report or data feed form (for example, for analyst viewing or processing by system(s)).

FIG. 3 depicts an example screen-shot in accordance with implementations of the present disclosure. The example screen-shot depicts an example workbench 300 that can be displayed (e.g., by the IDE 102). In the depicted example, the workbench 300 includes a projects frame 302, tabs 304a, 304b, and a console frame 306. In the depicted example, the projects frame 302 displays a file tree that identifies one or more files (e.g., source code files) that can be opened. In this example, the "Code 1" and "Code 2" files have been selected by a developer and opened. Consequently, tab 304a is provided and is associated with "Code 1," and tab 304b is provided and is associated with "Code 2." In this example, the tab 304a can be provided as an active tab (e.g., opened and being viewed) and tab 304b can be provided as a non-active tab (e.g., opened, but not being viewed). In the example of FIG. 3, a notification 320 is displayed and provides a code recommendation in accordance with implementations of the present disclosure.

Another example code can be provided as:

---

Listing 1: Example Code

---

```
10    public void leaveParkingSpot(Integer plateNum) {
11        for (ParkingSpace parkingSpace:occupiedParkingSpaces) {
12            if (parkingSpace.getVehiclePlate( ) == plateNum) {
13                occupiedParkingSpaces.remove(parkingSpace);
14
15                parkingSpace.setVehiclePlate(null);
16                parkingSpace.setSpaceEmpty(true);
17
18                if (availableParkingSpaceCount == 0) {
19                    isLotFull = false;
20                }
21                availableParkingSpaceCount++;
22            }
23        }
24    }
```

---

In the example code, an example code recommendation for the authored code snippet provided in line 11 can include:

This approach takes O(n)=n time. Use a HashMap to represent occupiedParkingSpaces to improve speed.

In the example code, another example code recommendation for the authored code snippet provided in line 12 can include:

No null check on plateNum (can lead to NPE). Must use .equals.

In the example code, another example code recommendation for the authored code snippet provided in line 13 can include:

Must use iterator in order to remove.

In the example code, another example code recommendation for the authored code snippet provided in line 16 can include:

This line can be deleted. Unnecessary due to previous line.

In the example code, another example code recommendation for the authored code snippet provided in line 19 can include:

Better to use Boolean.FALSE.

In the example code, another example code recommendation for the authored code snippet provided in line 21 can include:

No break (performance issue).

Figure 4:
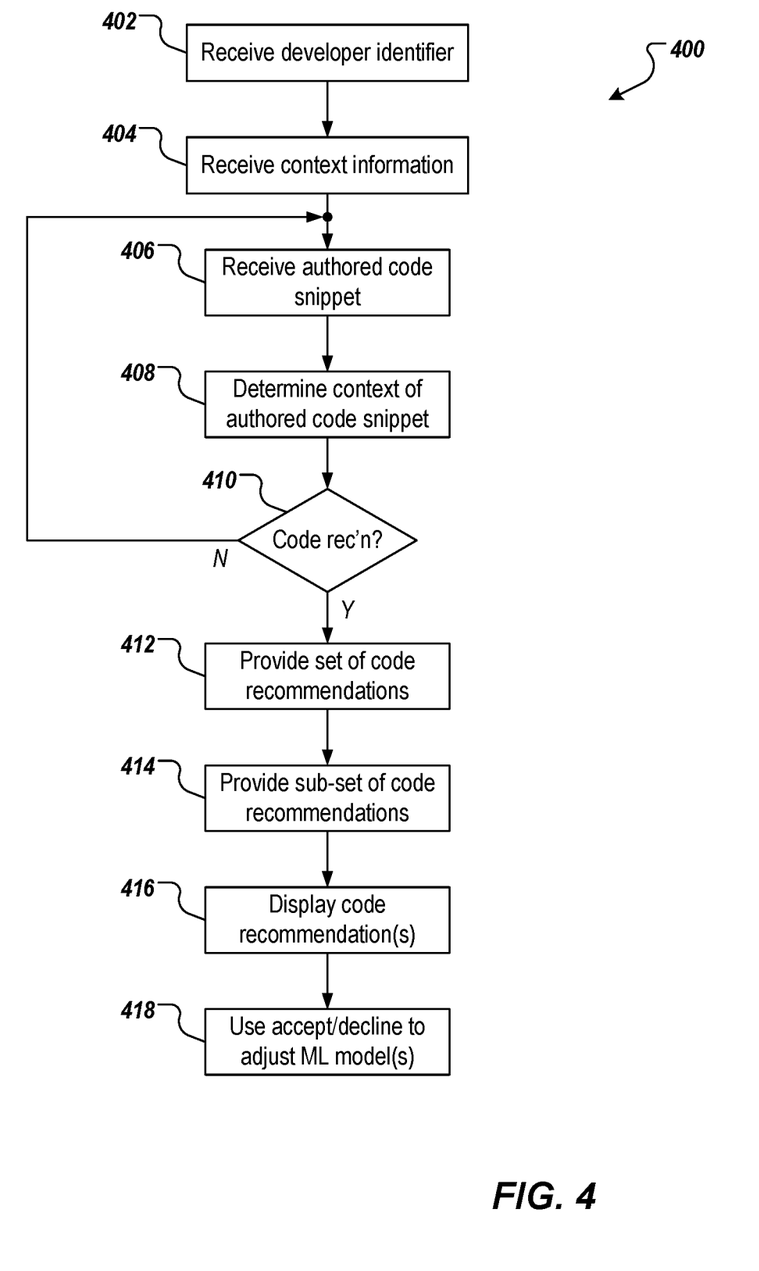
FIG. 4 depicts an example process that can be executed in accordance with implementations of the present disclosure.

FIG. 4 depicts an example process 400 that can be executed in accordance with implementations of the present disclosure. In some examples, the example process 400 can be executed by one or more computer-executable programs executed using one or more computing devices. The example process 400 can be executed to provide code recommendations in accordance with implementations of the present disclosure.

A developer identifier is received (402). For example, the code recommendation system 106 of FIG. 1 receives the developer identifier (user_id) in response to the developer 108 logging into the IDE 102. Context information is received (404). For example, developer data (e.g., context of the developer) is provided from a developer profile based on the developer identifier, as described herein. As another example, customer data (e.g., context of the customer, for which source code is authored) is provided from a customer profile based on customer_id, which can be obtained when source code being developed for the customer is accessed within the IDE 102, as described herein.

An authored code snippet is received (406). For example, and as described herein, as the developer 108 inputs keystrokes to the IDE 108, the keystrokes are provided to the code recommendation system 106 as the authored code snippet. That is, the authored code snippet is a portion of code that is authored by the developer 108 using the IDE 102. An example authored code snippet can include [for (ParkingSpace parkingSpace:occupiedParkingSpaces) {, if (parkingSpace. getVehiclePlate( )==plateNum) {], provided in lines 11-12 of Listing 1, above.

A context of the authored code snippet is determined (408). It is determined whether a code recommendation is to be made (410). If a code recommendation is not to be made, the example process 400 loops back to review additional authored code snippets, if any. A set of code recommendations is provided (412). For example, and as described herein, data can be provided as input to one or more ML models, which can provide a set of code recommendations as output. A sub-set of code recommendations is provided (414). In some examples, the sub-set of code recommendations can include all of the code recommendations included in the set of code recommendations. In some examples, the sub-set of code recommendations can include less than all of the code recommendations in the set of code recommendations. One or more code recommendations are displayed (416). An accept/decline of a code recommendation is used to adjust one or more ML models (418).

As described herein, implementations of the present disclosure achieve one or more example advantages. For example, implementations of the present disclosure enable development of consistent, higher-quality source code enabling more efficient applications resulting therefrom. For example, the applications can consume reduced technical resources (e.g., processors, memory) than applications developed using traditional code review systems. Further, implementations of the present disclosure provide real-time personalization of the solutions/actions customized for the developer and take into consideration the context of each developer. In addition, each developer can set certain preferences in settings, has demonstrated through their existing code certain preferences (e.g. predisposition towards open source vs proprietary, refactoring vs focused changes, elegant vs clearer code, performance vs memory, security focus, etc.), and has exhibited coding strengths and weaknesses. In this manner, development of source code is streamlined, further reducing the burden on technical resources that would otherwise be expended in the development process. In addition, the consistency of source code provided using implementations of the present disclosure reduces the overall total cost of ownership (TCO) of the source code (e.g., eases the burden in maintaining the source code).

Figure 5:
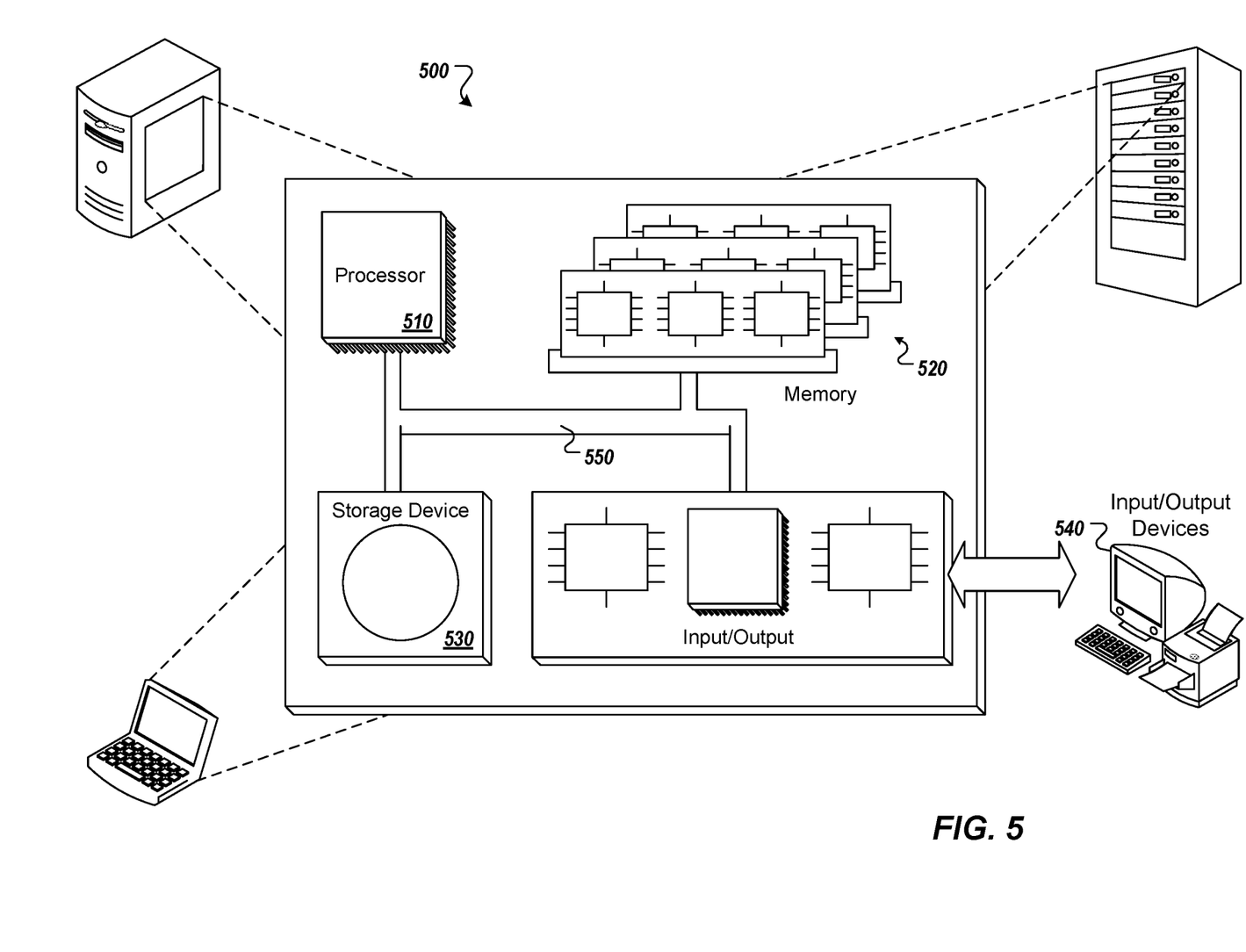
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 550. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 800. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing code recommendations in real-time in integrated development environments (IDEs), the method being executed using one or more processors and comprising:
   receiving, from an IDE, first authored code, the first authored code having been input by a developer to the IDE;
   receiving developer data representative of the developer, and context data and domain data associated with the first authored code, the context data representing a context of the first authored code and the domain data indicating a domain of the first authored code;

determining, at least partially based on processing the first authored code, the developer data, the context data, and the domain data through one or more machine learning (ML) models, that one or more code recommendations are to be displayed to the developer in the IDS;

defining a sub-set of code recommendations at least partially based on the first authored code and the context data, the sub-set of code recommendations comprising at least one code snippet that is included in the sub-set of code recommendations in response to determining that a frequency of acceptance of the at least one code snippet by developers in previous recommendations exceeds a threshold frequency for the context and the domain; and displaying graphical representations of code recommendations in the sub-set of code recommendations to the developer within the IDE.

2. The method of claim 1, wherein the developer data is received based on a user identifier that uniquely identifies the developer, at least a portion of the developer data representing an experience level of the developer, the sub-set of code recommendations being defined at least partially based on the experience level of the developer.

3. The method of claim 2, wherein the sub-set of code recommendations is defined in response to determining that the experience level of the developer is below a particular experience level.

4. The method of claim 1, wherein the developer data is received based on a user identifier that uniquely identifies the developer, at least a portion of the developer data representing a bug fix in code previously authored by the developer, the sub-set of code recommendations being defined at least partially based on the bug fix.

5. The method of claim 1, wherein the domain data represents a domain, within which an application resulting from the first authored code is to be executed, the sub-set of code recommendations being defined at least partially based on the domain.

6. The method of claim 1, further comprising:
receiving, from the IDE, second authored code, the second authored code having been input by the developer to the IDE; and
determining, at least partially based on processing the second authored code, the developer data, the context data, and the domain data through the one or more ML models, that one or more code recommendations are not to be displayed to the developer in the IDS.

7. The method of claim 1, further comprising receiving input data indicative of whether a code recommendations in the sub-set of code recommendations has been one of accepted and declined by the developer, wherein at least one ML model of the one or more ML models is adjusted based on the input data.

8. A non-transitory computer-readable storage medium coupled to one or more processors and having instructions stored thereon which, when executed by the one or more processors, cause the one or more processors to perform operations for providing code recommendations in real-time in integrated development environments (IDEs), the operations comprising:
receiving, from an IDE, first authored code, the first authored code having been input by a developer to the IDE;
receiving developer data representative of the developer, and context data and domain data associated with the first authored code, the context data representing a context of the first authored code and the domain data indicating a domain of the first authored code;
determining, at least partially based on processing the first authored code, the developer data, the context data, and the domain data through one or more machine learning (ML) models, that one or more code recommendations are to be displayed to the developer in the IDS;
defining a sub-set of code recommendations at least partially based on the first authored code and the context data, the sub-set of code recommendations comprising at least one code snippet that is included in the sub-set of code recommendations in response to determining that a frequency of acceptance of the at least one code snippet by developers in previous recommendations exceeds a threshold frequency for the context and the domain; and
displaying graphical representations of code recommendations in the sub-set of code recommendations to the developer within the IDE.

9. The computer-readable storage medium of claim 8, wherein the developer data is received based on a user identifier that uniquely identifies the developer, at least a portion of the developer data representing an experience level of the developer, the sub-set of code recommendations being defined at least partially based on the experience level of the developer.

10. The computer-readable storage medium of claim 9, wherein the sub-set of code recommendations is defined in response to determining that the experience level of the developer is below a particular experience level.

11. The computer-readable storage medium of claim 8, wherein the developer data is received based on a user identifier that uniquely identifies the developer, at least a portion of the developer data representing a bug fix in code previously authored by the developer, the sub-set of code recommendations being defined at least partially based on the bug fix.

12. The computer-readable storage medium of claim 8, wherein the domain data represents a domain, within which an application resulting from the first authored code is to be executed, the sub-set of code recommendations being defined at least partially based on the domain.

13. The computer-readable storage medium of claim 8, operations further comprise:
receiving, from the IDE, second authored code, the second authored code having been input by the developer to the IDE; and
determining, at least partially based on processing the second authored code, the developer data, the context data, and the domain data through the one or more ML models, that one or more code recommendations are not to be displayed to the developer in the IDS.

14. The computer-readable storage medium of claim 8, actions further comprise receiving input data indicative of whether a code recommendations in the sub-set of code recommendations has been one of accepted and declined by the developer, wherein at least one ML model of the one or more ML models is adjusted based on the input data.

15. A system, comprising:
a computing device; and
a computer-readable storage device coupled to the computing device and having instructions stored thereon which, when executed by the computing device, cause the computing device to perform operations for natural language explanations for providing code recommendations in real-time in integrated development environments (IDEs), the operations comprising:

receiving, from an IDE, first authored code, the first authored code having been input by a developer to the IDE;

receiving developer data representative of the developer, and context data and domain data associated with the first authored code, the context data representing a context of the first authored code and the domain data indicating a domain of the first authored code;

determining, at least partially based on processing the first authored code, the developer data, the context data, and the domain data through one or more machine learning (ML) models, that one or more code recommendations are to be displayed to the developer in the IDS;

defining a sub-set of code recommendations at least partially based on the first authored code and the context data, the sub-set of code recommendations comprising at least one code snippet that is included in the sub-set of code recommendations in response to determining that a frequency of acceptance of the at least one code snippet by developers in previous recommendations exceeds a threshold frequency for the context and the domain; and displaying graphical representations of code recommendations in the sub-set of code recommendations to the developer within the IDE.

16. The system of claim 15, wherein the developer data is received based on a user identifier that uniquely identifies the developer, at least a portion of the developer data representing an experience level of the developer, the sub-set of code recommendations being defined at least partially based on the experience level of the developer.

17. The system of claim 16, wherein the sub-set of code recommendations is defined in response to determining that the experience level of the developer is below a particular experience level.

18. The system of claim 15, wherein the developer data is received based on a user identifier that uniquely identifies the developer, at least a portion of the developer data representing a bug fix in code previously authored by the developer, the sub-set of code recommendations being defined at least partially based on the bug fix.

19. The system of claim 15, wherein the domain data represents a domain, within which an application resulting from the first authored code is to be executed, the sub-set of code recommendations being defined at least partially based on the domain.

20. The system of claim 15, operations further comprise:

receiving, from the IDE, second authored code, the second authored code having been input by the developer to the IDE; and determining, at least partially based on processing the second authored code, the developer data, the context data, and the domain data through the one or more ML models, that one or more code recommendations are not to be displayed to the developer in the IDS.

\* \* \* \* \*